Figure 4:
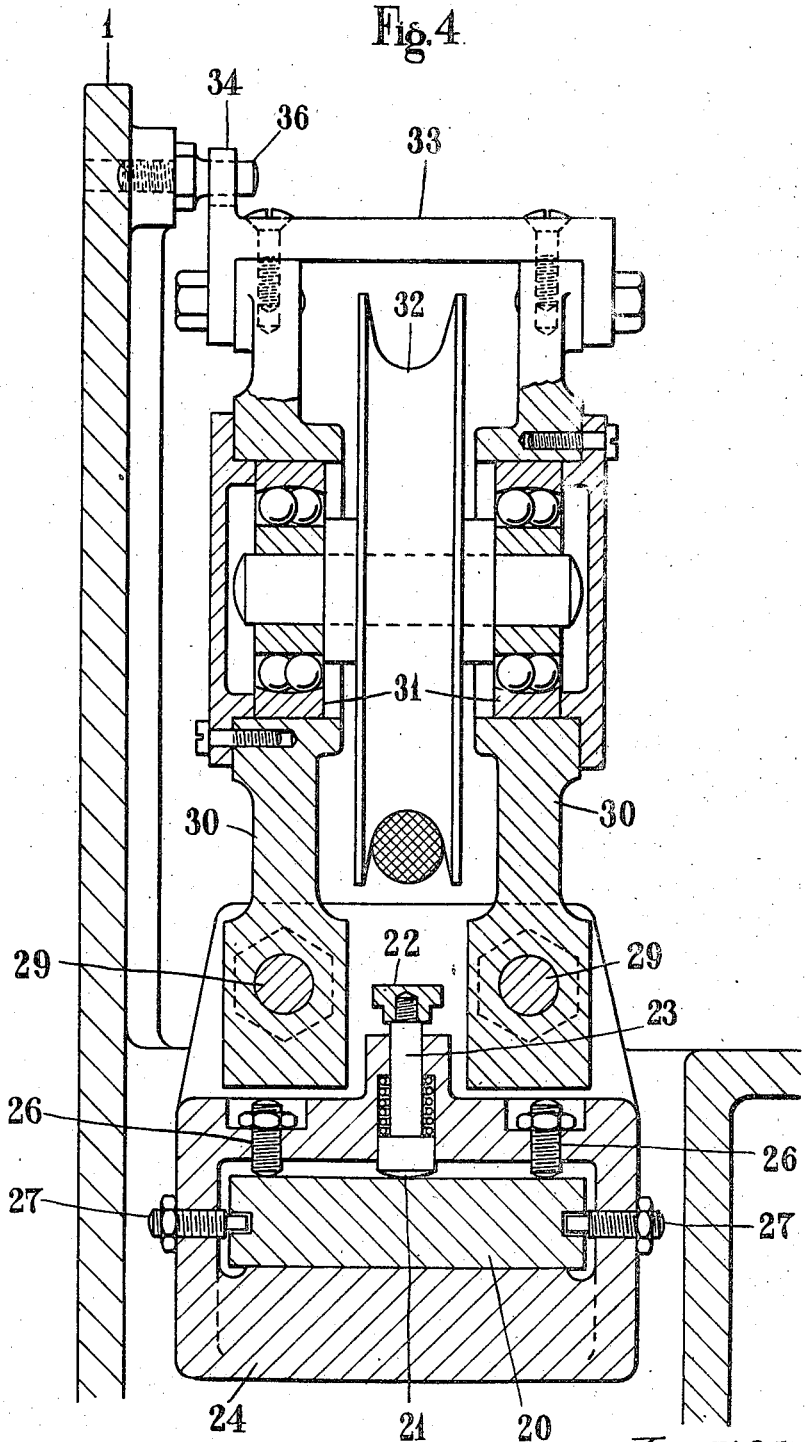

Oct. 26, 1948.  H. HITCHEN  2,452,302
CABLE TENSIOMETER
Filed Nov. 13, 1944  3 Sheets-Sheet 1
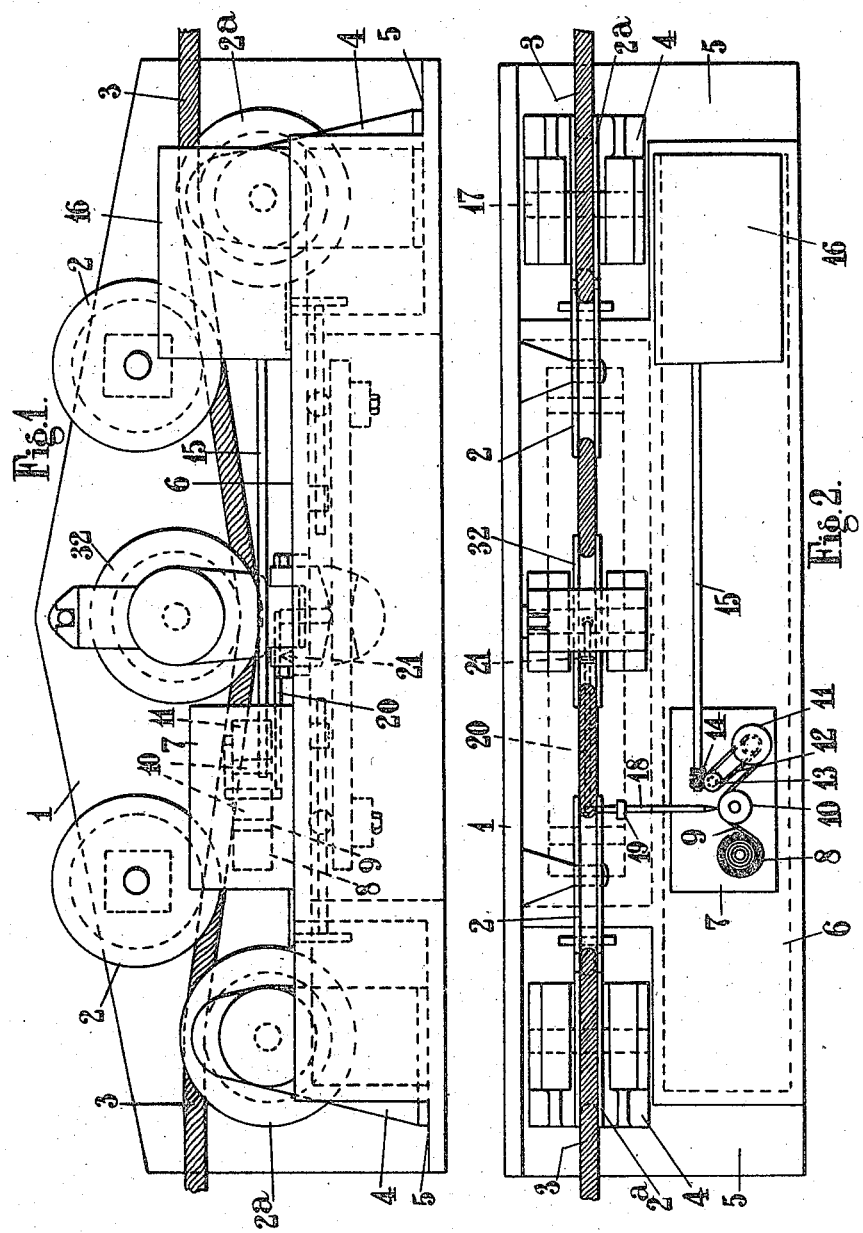
Inventor
H. Hitchen Oct. 26, 1948. H. HITCHEN 2,452,302
CABLE TENSIOMETER
Filed Nov. 13, 1944 3 Sheets-Sheet 2
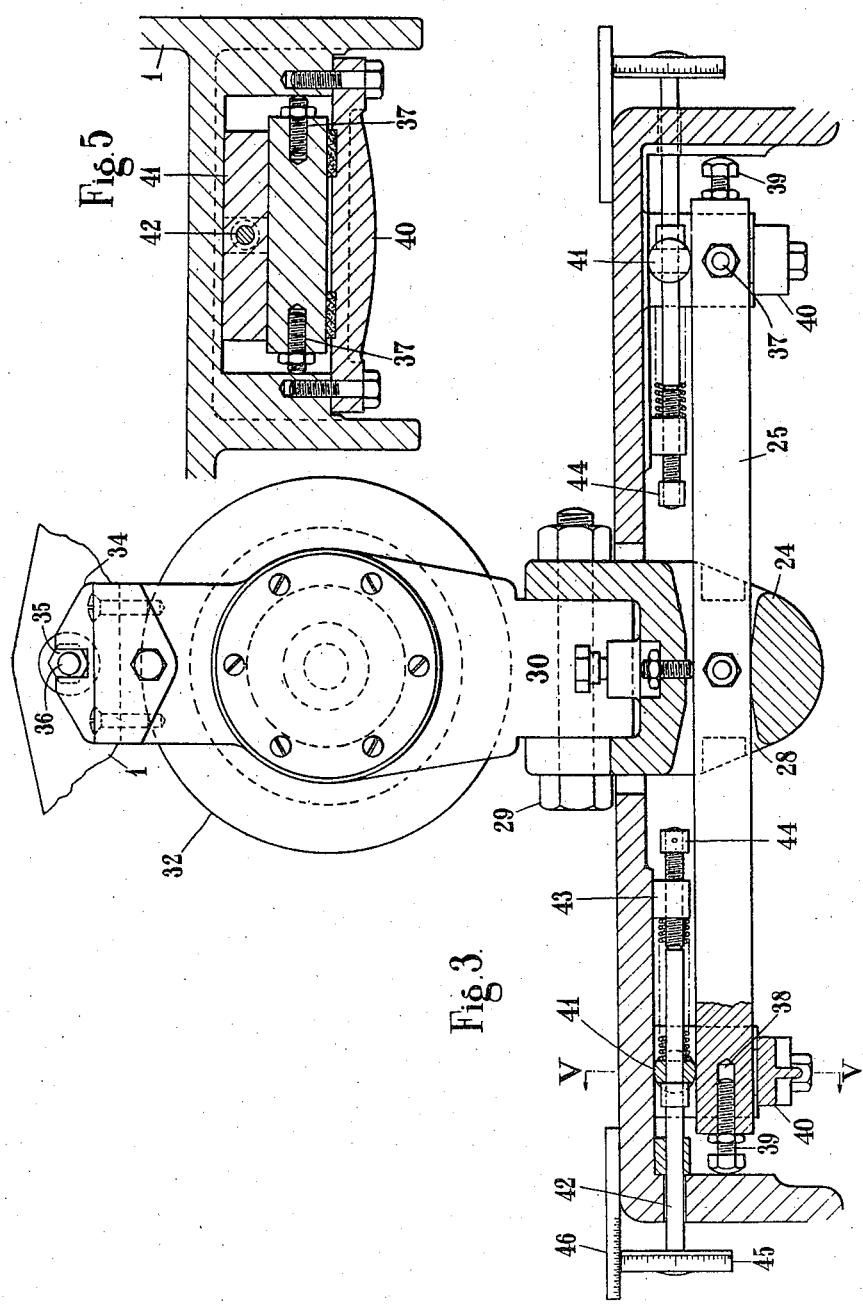

Oct. 26, 1948.                    H. HITCHEN                    2,452,302
                                CABLE TENSIOMETER
Filed Nov. 13, 1944                                        3 Sheets-Sheet 3

Inventor
H. Hitchen
By Glascock Downing etc Attys

Patented Oct. 26, 1948

2,452,302

UNITED STATES PATENT OFFICE 2,452,302

CABLE TENSIOMETER

Herbert Hitchen, Doncaster, England, assignor to British Ropes Limited, Doncaster, England Application November 13, 1944, Serial No. 563,228
In Great Britain July 16, 1943

Section 1, Public Law 690, August 8, 1946
Patent expires July 16, 1963

1 Claim. (Cl. 73—144)

This invention relates to means for determining tensile stresses in haulage and other ropes.

In British specification No. 540,885, there is claimed means for this purpose, comprising two pulleys spaced apart and rotatable about axes in fixed relation with the ends of a bar having secured to it at a position intermediate between its ends the bearings of a further pulley or roller in such manner that variation in the tension of a rope passing over the pulleys or rollers will vary the bending moment to which the bar is subjected.

With a construction as described in detail in the specification referred to, variation in the diameter of the rope with which the means is used will operate without re-calibration to give inaccurate indications of the tensile stresses in the rope due to the unavoidable variation in the position of the neutral axis of that portion of the rope which passes between the two pulleys rotatable about axes in fixed relation with the ends of the bar which are spaced apart and the further pulley which is located between them and is rotatable in bearings secured to the bar, the thicker the rope the steeper being the angle of deflection of the portion of the rope extending between each of the first-mentioned pulleys and the pulley positioned intermediately between them when the rope passes over the two first-mentioned pulleys and below the other pulley.

The object of the present invention, which may be regarded as an improvement in or modification of the invention of British Letters Patent No. 540,885, is to provide a construction of device within the scope of the claims thereof which will give more accurate indications when used with ropes differing in diameter without the necessity for re-calibrating.

According to the invention, means is provided for constraining the rope to contact with the portions of the pulleys in question which are located on the same side of their axes, that is to say, the rope may be constrained to pass under all of the three pulleys or over all of the three pulleys as the case may be.

For constraining the rope into contact with the two pulleys, additional pulleys rotatable about axes in fixed relationship with the ends of the bar are provided, one positioned with respect to one of the two first-mentioned pulleys so that the rope is constrained against, for instance, its lower portion, and a similar arrangement is provided in association with the other of the first-mentioned pulleys.

With such a construction as will be appreciated, the rope will pass over one of the additional pulleys and then under one of the two pulleys rotatable about axes in fixed relationship with the ends of the bar, under the intermediate pulley, under the other of the two pulleys and then upward and over the other of the additional pulleys, or it may be arranged to pass under each of the additional pulleys and over the other three pulleys where the general direction of travel of the rope is horizontal.

The additional pulleys merely function as guides in causing the rope to bear upon or against the pulleys including those which are denoted by the expression "pulleys rotatable about axes in fixed relation with the ends of the bar" and between which extends the length of rope co-operating with the intermediate pulley secured to the bar in measuring the tensile stresses in the rope.

These additional pulleys in fact also rotate about axes in fixed relationship with the ends of the bar, but they may be arranged to be adjustable in accordance with the thickness of the rope with which the device is used, that is to say, assuming the general direction of the travel of the rope is horizontal they may be arranged to be adjusted vertically with the aid of packing or otherwise and are additional to and are not to be confused with the pulleys in connection with which the expression above referred to is used.

The invention will be described further in detail by way of example with reference to the accompanying drawings in which:

Figures 1 and 2 are respectively views in elevation and plan of one construction in accordance with the invention, Figures 3 and 4 being views in sectional elevation on a larger scale showing more clearly certain constructional details, Figure 5 being a view in section on a plane indicated by the line V—V in Figure 3.

In the drawings 1 is the main frame of the device which is designed to be secured to some rigid support and has rigidly secured to it pulleys or rollers 2 below and in contact with which a haulage rope or the like 3 is constrained to bear by the additional rollers 2a mounted in brackets 4 on platforms 5 provided on the main frame.

The frame also provides a platform 6 for a recording device 7 which comprises a film bearing roller 8, the film 9 being unwound from this roller and passed over a second roller 10 on to a take-up roller 11 which is driven through a band 12 from a pulley 13 on a spindle with which is connected a worm wheel driven by a worm 14 secured to a spindle 15 which is arranged in driving connection through a variable speed gear and a unidirectional drive arrangement enclosed in a casing 16 with the spindle 17 of one of the grooved rollers above referred to.

The film of the recording device which operates in accordance with the "stylus on Celluloid" method of recording, is adapted to be deformed or displaced by the pointed end of a lever 18 on a fulcrum 19 so that the pointed end will be displaced by motion of the lever about its fulcrum, such displacement being effected by the motion imparted as the result of the deflection of the beam, to a second lever 20 about its fulcrum 21, one end of the lever 20 being constrained by a spring to bear upon the head 22 of a pin 23 which passes through an aperture in a shoe 24, the end of the pin bearing in turn upon the centre point of a bar 25, screws 26 and screws 27, the latter entering recesses in the bar, securing the shoe in its appropriate position with respect to the bar, the eye 28 of the shoe being shaped to permit deflection of the bar.

The shoe is secured by bolts 29 to the members 30 in which are provided roller bearings 31 for the spindle of the pulley 32 below which the rope is passed, and these members are also connected together by a yoke-piece 33 furnished with a lug 34 in which is provided a recess 35 engaging a pin 36 and functioning to prevent or limit lateral motion of the yoke-piece and its associated parts.

To ensure that the bar is appropriately positioned, the ends of the bar are furnished with screws 37 engaging in holes 38 and arranged so that their ends bear on portions of the frame, and with screws 39, the heads of which contact with other portions of the frame as shown in Figures 3 and 5, the ends of the bar being engaged by a bridge piece 40 secured to the base.

To provide adjustment for the bearing points of the bar for the purpose of calibration, the bar is arranged to bear adjacent to its ends upon adjustable cylindrical bearing elements 41.

With these adjustable cylindrical elements there is associated an adjusting screw 42 which is engaged in a boss 43 extending from the base of the frame, one end of each of the screws being furnished with a sleeve 44 adapted to prevent the screws being inadvertently disengaged from the bosses.

The heads of these adjusting screws are provided with graduated elements 45 which co-operate with graduated index elements 46 to enable the position into which the cylindrical bearings are adjusted to be determined.

The device illustrated, having been adjusted and calibrated so that the pointed end of the lever which acts as a recording needle or stylus assumes a given position with respect to the strip on which the record is to be formed, variation in the tension of the rope will cause the recording needle or stylus to be displaced from its initial or normal position, and thus a graphic indication of the various stresses in the rope will be formed upon the strip.

The graphic indications obtained on the Celluloid film and which are produced by plastic deformation of the Celluloid film under comparatively slight pressure exerted on it by the stylus, when viewed by transmitted parallel light with the microscope properly focussed will show the indentations as a narrow sharply defined dark band on a bright ground with a still finer bright line in the centre of the dark band, and measurements of the magnified record obtained can be secured with a high degree of accuracy.

The method of forming a record on a transparent Celluloid film, as above described, is known and so far as the present invention is concerned, this known method of forming a record is applied to the particular problem of determining variation of tensile stresses in haulage and other ropes.

I claim:

A cable tensiometer comprising a frame, a resilient bar rigidly secured at each of its ends to the frame, two pulleys mounted on the frame for rotation about spaced parallel axes, a member engaging the bar intermediate its length, bearings in the member, a third pulley mounted in said bearings for rotation about an axis between and parallel to said axes, the lower peripheral portion of said third pulley being below the lower peripheral portions of the said two pulleys, two additional pulleys mounted on the frame for rotation about axes parallel to said previously recited axes, all of said pulleys lying in a common plane, said two additional pulleys being positioned respectively outwardly of said two pulleys and with their upper peripheral portions above the lower peripheral portions of said two pulleys whereby a tensioned cable passing over the said two additional pulleys is maintained in contact with the lower peripheral portions of the three first mentioned pulleys and means for indicating the deflection of said resilient bar.

HERBERT HITCHEN.

REFERENCES CITED

The following references are of record in the file of this patent:

UNITED STATES PATENTS

| Number | Name | Date |
|---|---|---|
| 1,987,815 | Bartol | Jan. 15, 1935 |
| 2,343,229 | Stone et al. | Feb. 29, 1944 |

FOREIGN PATENTS

| Number | Country | Date |
|---|---|---|
| 540,885 | Great Britain | Nov. 4, 1941 |